United States Patent [19]

Polovina

[11] 3,798,057

[45] Mar. 19, 1974

[54] IMPREGNATED FIBROUS WEB STRUCTURES

[75] Inventor: Walter Polovina, Princeton, N.J.

[73] Assignee: AB Carl Munters, Sollentuna, Sweden

[22] Filed: Oct. 5, 1971

[21] Appl. No.: 186,768

[52] U.S. Cl. ....... 117/126 AB, 117/136, 117/140 A, 117/161 A, 260/3.3, 260/837 R
[51] Int. Cl......................... B32b 19/02, C08g 45/04
[58] Field of Search ......... 117/126 AB, 126 R, 136, 117/161 A, 140 K; 260/837 R, 3.3

[56] References Cited
UNITED STATES PATENTS

| | | | |
|---|---|---|---|
| 3,464,543 | 9/1969 | Kwiatanowski et al. ..... | 117/126 AB |
| 2,101,449 | 12/1937 | Parry ........................... | 117/126 AB |
| 3,099,632 | 7/1963 | De Crease ..................... | 260/3.3 |
| 3,405,199 | 10/1968 | Snedeker ....................... | 260/837 R |
| 3,437,611 | 8/1969 | Macklin ......................... | 260/3.3 |
| 3,652,494 | 3/1972 | Baker............................ | 260/837 R |

OTHER PUBLICATIONS

Winkler, "New and Modified Epoxy Stabilizers," Ind & Eng. Chem. Vol. 50, 863–864 (1958).

*Primary Examiner*—William D. Martin
*Assistant Examiner*—William H. Schmidt
*Attorney, Agent, or Firm*—Curtis, Morris & Safford

[57] ABSTRACT

Fibrous webs, such as asbestos paper, are impregnated with a mixture of a chlorinated polymeric $C_3$ or $C_5$ hydrocarbon, a chlorinated terphenyl or chlorinated paraffin plasticizer, and a polyepoxy compound. The impregnated webs, when suitably shaped, are useful as contact tower air and water contact bodies.

12 Claims, No Drawings

IMPREGNATED FIBROUS WEB STRUCTURES

The present invention relates to impregnated fibrous web structures and to methods of making the same. More in particular, the present invention relates to impregnated fibrous web structures in the form of a shaped water-resistant non-flammable sheet adaptable to use in cooling tower air and water contact bodies.

U.S. Pat. No. 3,395,903 to Norback et al. describes air and water contact bodies of the type employed in cooling towers, humidifiers, etc. comprising interleaved corrugated layers of a non-metallic material. In use, water is sprayed over the contact bodies to effect heat and water vapor transfer between the water and the ambient air.

Such contact bodies are usually formed from a fibrous non-metallic material, preferably a non-flammable or fire-resistant substance such as asbestos paper, which fibrous material has been impregnated with a resin to improve its rigidity and wet strength. As noted in the aforementioned patent, phenol resins or melamine-formaldehyde resins have been widely employed in the past as impregnants for such sheets used in making contact bodies.

It has been found that the impregnated sheet materials of the prior art, while satisfactory at pH's surrounding the neutral point (pH 7), are susceptible to degeneration when in contact with water at higher and lower pH values. Melamine formaldehyde resins, for instance, have been found susceptible to fairly rapid hydrolysis at alkaline pH's. This is particularly undesirable because the acid chromates heretofore widely used as additives in water-cooled refrigeration and air conditioning systems are being more and more replaced by more alkaline additives. In general, the impregnated formed sheets used in the prior art for forming contact bodies are most useful between pH's of 6 and 9. At pH values above or below these, there is a strong tendency for the impregnating resin to be attacked and removed from the sheets, resulting in weakening of the sheets and eventual destruction and collapse of the contact bodies.

The present invention relates to fibrous webs, useful for forming contact bodies of the type described above, impregnated with a resin mixture which imparts good rigidity to the web structure, is non-flammable, is highly resistant to acid and alkaline attack, and can be used at pH's as low as 4 and as high as 13. The impregnated fibrous webs of the present invention are impregnated and coated with a mixture principally comprising a chlorinated hydrocarbon resin, a chlorinated additive thereto which functions as a plasticizer and/or film-forming agent, and a polyepoxy compound believed to function as a cross-linking agent imparting additional strength and rigidity to the resins and resin-coated fibrous webs. Also, the mixtures used for impregnation and coating may optionally contain pigments, particularly carbon black, and mineral fillers such as clays or powdered silica.

The fibrous webs treated with this mixture are, as mentioned, preferably non-flammable. Such webs generally comprise mineral fibers such as asbestos or glass fibers, and may be woven or, more usually, are non-woven. In devices in which there is little fire hazard, such as in small humidifier units for the home, other fibrous webs may be employed, including cellulosic webs, webs comprising polyester fibers, or webs containing these fibers with each other or in combination with non-flammable mineral fibers such as asbestos or glass fibers.

These various fibrous webs are usually less than a millimeter in thickness, e.g. from 0.1 to 1 mm thick. For example, the compositions of the present invention have been used to coat and impregnate fibrous webs 12 mil (about 0.3 millimeters) and 19 mil (about 0.5 millimeter) thick.

The composition used to treat such fibrous webs principally comprises a chlorinated polymeric hydrocarbon, specifically a chlorinated polypropylene ("chlorinated $C_3$ polymeric hydrocarbon") or chlorinated rubber. The chlorinated rubbers are preferred, and may be either natural rubbers or synthetic rubbers. Both the natural and synthetic rubbers principally comprise isoprene ($C_5$) units, and will be referred to hereinafter as "chlorinated polymeric $C_5$ hydrocarbons."

Suitable chlorinated rubbers are commercially available under the tradename "Parlon," for example. These rubbers contain about 65 percent by weight of chlorine, which insures good fire resistance. The rubbers are available in a variety of grades, depending on their weight-average molecular weight. Materials varying in weight average molecular weight between about 30,000 and about 120,000, or mixtures of the materials, have been found suitable for use in the present invention. In general, better penetration into a fibrous web can be obtained with the lower molecular weight materials, whereas the higher molecular weight materials tend more to form desirable films of the fire-resistant resin on the surface of the fibrous web being treated. Thus, mixtures containing both high molecular weight and low molecular weight materials have proved particularly advantageous in achieving both good impregnation as well as coating of the materials being treated.

In the alternative, chlorinated polypropylene resins may be employed. These materials are also available commercially, for example under the name "Parlon," and are available with the same degree of chlorination (about 65 percent) and in the same variety of grades depending on molecular weight, as are the chlorinated rubbers.

It is desirable, according to the present invention, to combine a material functioning as a plasticizer and/or film-forming agent with these chlorinated $C_3$ and $C_5$ polymeric hydrocarbons. Particularly suitable plasticizers and/or film-forming agents include chlorinated terphenyls, such as those commercially available under the tradename "Aroclor," and chlorinated paraffins, i.e., chlorinated higher aliphatic hydrocarbons having 20 – 30 carbon atoms.

Both the chlorinated terphenyls and the paraffin hydrocarbons are available commercially containing different amounts of chlorine. Those materials containing between about 40 percent and about 70 percent by weight of chlorine are particularly useful and include, for example, a chlorinated terphenyl available under the tradename "Aroclor 5460," which is a solid resin containing about 60 percent by weight of chlorine; "Chlorowax 70," a solid paraffin hydrocarbon chlorinated to an extent of 70 percent by weight; and "Chlorafin C–40," a liquid plasticizer containing from 40 to 42 percent of chlorine by weight.

The plasticizing and/or film-forming ingredients described above can be combined with the chlorinated polymeric hydrocarbon principally comprising the impregnating mixtures of the present invention in amounts from 5 to 50 percent by weight of the polymeric hydrocarbon, preferably in amounts from 5 – 25 percent by weight.

A further component of the impregnating mixtures according to the present invention is a polyepoxy compound which imparts rigidity and resistance to softening by heat to the compositions of the invention. The exact role of the polyepoxy compound in the claimed compositions is not known. However, because of its poly-functionality, it is believed it may act in the present compositions as a cross-linking agent. The polyepoxy compounds are glycidyl ethers of phenols, specifically diglycidyl or polyglycidyl ethers of bisphenols such as bisphenol A and bisphenol F. Diglycidyl ethers of bisphenol A or mixtures predominantly containing such diglycidyl ethers in combination with smaller amounts of higher molecular weight polyglycidyl ethers or bisphenol A have been used to particular advantage in the present invention.

In general, the amount by weight of such a polyepoxy compound in the compositions of the present invention may be between about 0.5 and 10 percent, by weight of the chlorinated polymeric hydrocarbon forming the principal ingredient.

Finally, the compositions of the present invention may optionally contain pigments and/or fillers. In particular, the compositions may contain up to about 2 percent, by weight of the chlorinated polymeric hydrocarbon, of a pigment, suitably finely-divided carbon black which serves not only to color the compositions but also to afford some degree of ultraviolet protection to the resinous impregnants when they are used outdoors.

The fillers or extenders which may optionally be present in amounts up to 50 percent by weight of the chlorinated hydrocarbon resin component include minerals such as finely divided clays, amorphous silica, or aluminum oxide powders. The finely divided particulate materials should have an average particle size less than two microns in diameter, preferably less than 1 micron. While the use of such fillers or extenders decreases the cost of the impregnating compositions of the present invention, it renders the compositions somewhat more susceptible to attack by acids. Accordingly, those compositions which are to have maximum resistance to acid attack are preferably free of fillers of this type.

The impregnating mixtures of the present invention are suitably applied to a fibrous web from a solution in a volatile organic solvent. The chlorinated polymeric hydrocarbons forming the base of the mixtures are soluble in a variety of aliphatic and aromatic solvents including among others, benzene, "Cello-Solve" solvents, carbon tetrachloride, cyclohexanone, ethyl acetate, methylene chloride, methyl ethyl ketone, "Solvesso" solvents, toluene, and xylene. Most commonly, the compositions are prepared in toluene by dissolving the components therein in any order to produce solutions containing from 10 to 50 percent by weight of solids.

For application to a fibrous web structure, solutions having a solids content of from 20 to 35 percent by weight are conveniently employed. Of course, more concentrated solutions can be prepared for shipping, to reduce shipping costs. Also, the solids content in the solutions applied to the fibrous webs may deviate considerably from the limits set forth above depending on the mode of application and the efficiency desired in the coating operation. For example, dilute solutions containing only 10 percent by weight of solids can be applied by multiple dipping and intervening drying. On the other hand, high pressure rolls can be used to force highly concentrated solutions of the impregnant into a fibrous web.

In a typical application, a fibrous web such as asbestos paper is saturated by contacting the paper with a solution of the impregnant, conveniently by immersion. Spraying, roll coating, or other conventional techniques may also be employed, however. Excess solvent may then be removed by squeezing and/or evaporation. If desired, the dampened sheet may now be formed into a desired shape, e.g. a corrugated sheet when the impregnated sheets are to be used in forming contact bodies like those in the aforementioned Norback et al. patent. Conventional forming techniques are employed: vacuum forming has proved particularly convenient. Finally, the remainder of the solvent is removed, usually by evaporation, for example in an electric oven or with circulating hot air, taking into account the possible flammability and/or toxic nature of any solvent employed. In the laboratory, heating for 5 minutes at 100° C. has been used. In commercial production, heating at 250° – 300° C. for 30 – 60 seconds is sufficient. These times and temperatures are merely convenient, and are in no way critical.

An alternative method for impregnating a fibrous web comprises saturating the web with the impregnating solution by immersion or the like, partially or completely drying without forming, and then storing the treated web for later processing. Partially dried webs may be stored in sealed containers, such as plastic bags, to retain the solvent therein until they are formed. Completely dried webs can be resoftened by spray misting or wiping a small amount of solvent onto one or both sides of the sheets immediately prior to forming. Any solvent still present in the web is removed by evaporation after forming, suitably at elevated temperatures for speed and convenience in processing.

The dry finished product generally comprises from 10 to 30 percent of impregnant therein, by weight of the treated product.

A better understanding of the present invention and of its many advantages will be had by referring to the following specific examples, given by way of illustration.

EXAMPLE 1

A solution for impregnating a fibrous web was prepared as follows.

About 48 parts by weight of toluene were placed in a steel mixing vessel having a tightly-fitting cover and equipped with an explosion proof high speed stirrer, such as a "Lightning" or "Cowles" mixer. 21.3 parts by weight of "Parlon S–5" grade chlorinated rubber, 10.78 parts of "Parlon S–10" grade chlorinated rubber, and 2.12 parts of "Aroclor 5460" chlorinated terphenyl were added to the solvent with continuous stirring.

When the solids are dissolved, 0.20 part of "ERL–2774" polyepoxide resin and 1.70 parts of "Black Shield 7699" carbon black pigment were added with continued agitation. (By adding the pigment last, visual inspection can be used to assure that all other solids have already been dissolved.) The resulting mixture was adjusted to a desired viscosity (solids content = 34.9 percent) by the addition of further toluene to bring the total amount of toluene to 63.9 parts by weight.

12 mil asbestos paper was impregnated with this solution by immersion in the solution for 30 seconds to saturate the paper. Excess solution was removed by passing the paper over a roll. The damp sheet was then vacuum-formed to produce corrugations therein as described in Norback et al. U.S. Pat. No. 3,395,903. The remaining toluene was then removed by heating in an electric oven at a temperature of about 100° C.

The percent saturation of the 12 mil paper was between 15 and 18 percent by weight. "Percent saturation" is defined as:

(increase in weight of treated product/weight of treated product) × 100.

Samples of the treated sheet were subjected to accelerated aging tests which involved continuous exposure for 3 – 5 days to hot refluxing acid and alkaline solutions at pH values, respectively, of 4 and 13. The samples showed substantially no weight loss under these conditions. Under the same conditions, in contrast, samples of asbestos paper impregnated with a melamine-formaldehyde resin show a loss in weight of the resin from 25 – 50 percent. The samples prepared according to the invention also behave well when submitted to an accelerated heat aging test at 100° C., resisting both discoloration and embrittlement at this temperature.

In the composition of this Example, "Parlon S–5" is a chlorinated polyisoprene rubber (64 – 65 percent chlorination) having a weight average molecular weight of about 30,000 and a viscosity of 4 – 7 centipoises (20 percent concentration in toluene at 25° C.).

"Parlon S–10" is a chlorinated rubber of the same degree of chlorination, having a weight average molecular weight of about 60,000 and a viscosity of 9 – 14 centipoises measured under the same conditions.

"Aroclor 5460" is a terphenyl chlorinated to 60 percent by weight.

"ERL–2774" is a mixture of diglycidyl and polyglycidyl ethers of bis-phenol A comprising about 80 percent by weight of diglycidyl ether and 20 percent by weight of polyglycidyl ethers of higher molecular weight. The material has an average molecular weight of 360 – 390, i.e., an epoxide equivalent of about 180 – 195. (A purified product containing substantially 100 percent of the diglycidyl ether of bis-phenol A, marketed under the tradename "ERL–2772" can be used with equivalent results in this and other examples.)

The "Black Shield 7699" pigment comprises finely divided carbon black dispersed in toluene (30 percent solids by weight).

If desired, the amounts of higher and lower molecular weight chlorinated rubbers in the compositions can be varied, or the rubbers may be replaced in whole or in part by chlorinated polypropylenes, as exemplified hereinafter. For example, equal amounts of the "S5" and "S10" grades of chlorinated rubbers can be used, or still higher molecular weight materials ("S20" or "S125" having average molecular weights of 120,000 and higher) can be used in amounts forming from 10 to 25 percent by weight of the total chlorinated hydrocarbons present, for example.

EXAMPLE 2

A second impregnating solution containing relatively larger amounts of the chlorinated polymeric hydrocarbons was prepared in the manner described above using the same ingredients in the following proportions:

| Composition | Percent by Weight |
| --- | --- |
| "Parlon S-5" chlorinated rubber | 25.32 |
| "Parlon S-10" chlorinated rubber | 12.80 |
| "Aroclor 5460" chlorinated terphenyl plasticizer | 2.52 |
| "ERL-2774" polyepoxide compound | 0.24 |
| "Black Shield 7699" carbon black dispersion (30 percent in toluene) | 2.02 |
| Toluene | 57.10 |
| | 100% |
| | (percent solids=41.5) |

EXAMPLE 3

The composition of Example 1 was reformulated substituting 2.12 parts by weight of "Chlorafin C–40," a liquid chlorinated paraffin (principally $C_{24}$, MW ≅ 530), as a plasticizer and film-former for the chlorinated terphenyl of Example 1. The rigidity and chemical resistance of the composition were satisfactory after application to an asbestos sheet.

EXAMPLE 4

The composition of Example 1 was reformulated substituting 2.12 parts by weight of "Chlorowax 70," a chlorinated solid paraffin (principally $C_{24}$, MW ≅ 1060) for the chlorinated terphenyl plasticizer/film-forming agent of Example 1. Satisfactorily rigid structures were obtained on asbestos paper.

EXAMPLE 5

A composition like that in Example 4 was formulated, but with relatively larger amounts of the plasticizer relative to the amount of chlorinated hydrocarbon present. Specifically, the composition of the solution prepared and used to impregnate asbestos paper was:

| Composition | Percent by Weight |
| --- | --- |
| Chlorinated rubber (65% chlorine; MW≅30000) | 18.90 |
| Chlorinated rubber (65% chlorine; MW≅60000) | 8.90 |
| Chlorinated paraffin (70% chlorine; MW≅1060) | 6.40 |
| Bisphenol-A polyglycidyl ether compound (MW≅360–390) | 0.20 |
| Carbon black dispersion in toluene (30% solids) | 1.70 |
| Toluene | 63.90 |
| | 100% |

Satisfactory structures were obtained.

EXAMPLE 6

A composition similar to that in Example 5 above was prepared substituting 6.40 parts of "Aroclor 5460" (60 percent chlorinated terphenyl) plasticizer/film-forming agent for the chlorinated paraffin. Again, samples of good rigidity were obtained. In Examples 5 and 6, the plasticizer is about 23 percent by weight of the total chlorinated polymeric hydrocarbon.

EXAMPLE 7

A composition containing 6 percent of polyepoxy compound, by weight of chlorinated polymeric hydrocarbon therein, was prepared as in Example 1 but with the following composition:

| Composition | Percent by Weight |
| --- | --- |
| Chlorinated rubber (65% chlorine; MW≅30000) | 32.10 |
| Chlorinated paraffin plasticizer/film-forming agent (70% chlorine; MW≅1060) | 3.20 |
| Bisphenol polyglycidyl ether compound (MW≅360–390) | 2.00 |
| Carbon black in toluene (30% solids) | 1.70 |
| Toluene | 61.00 |
| | 100% |

EXAMPLE 8

Compositions were made up employing chlorinated polypropylene resins instead of chlorinated polyisoprene rubbers. Specifically, a first mixture had the following composition:

| Composition | Percent by Weight |
| --- | --- |
| "Parlon P-5" chlorinated polypropylene (65% chlorine; MW≅30000) | 21.30 |
| "Parlon P-10" chlorinated polypropylene (65% chlorine; MW≅60000) | 10.78 |
| "Aroclor 5460" chlorinated terphenyl plasticizer/film-forming agent (60% chlorine) | 2.12 |
| "ERL-2774" polyglycidyl ether of Bisphenol A (MW≅360–390) | 0.20 |
| "Black Shield No. 7699" carbon black in toluene (30% solids) | 1.70 |
| Toluene | 63.90 |
| | 100% |

A second composition comprising chlorinated polypropylene was prepared from the following ingredients and used to impregnate asbestos paper.

| Composition | Percent by Weight |
| --- | --- |
| Chlorinated polypropylene ("P-5") | 32.08 |
| "Aroclor 5460" chlorinated terphenyl plasticizer/film-forming agent | 2.12 |
| "ERL-2774" polyepoxy compound | 0.20 |
| "Black Shield 7699" carbon black in toluene (30% solids) | 1.70 |
| Toluene | 63.90 |
| | 100% |

What is claimed is:

1. An acid-, alkali-, and water-resistant fibrous web impregnated with from 10 to 30 percent, by weight of the impregnated web, of a mixture comprising a chlorinated polymeric $C_3$ or $C_5$ hydrocarbon; about 5 to about 50 percent, by weight of said polymer, of a chlorinated terphenyl or chlorinated paraffin; and about 0.5 to about 10 percent, by weight of said polymer, of a polyglycidyl ether of a polyhydric phenol, said fibrous web having been rigidified by said polyglycidyl ether of a polyhydric phenol.

2. An impregnated fibrous web as in claim 1 wherein said impregnating mixture additionally contains up to 2 percent of carbon black and up to 50 percent of mineral fillers, by weight of said polymer.

3. An impregnated fibrous web as in claim 1 wherein said polymer is a chlorinated rubber comprising about 65 percent by weight of chlorine.

4. An impregnated fibrous web as in claim 1 wherein said polyglycidyl ether is a polyglycidyl ether of a bisphenol.

5. A shaped, acid-, alkali-, and water-resistant, non-flammable sheet, adaptable to use in forming contact tower air and water contact bodies, comprising a non-flammable web of mineral fibers impregnated with from 10 to 30 percent, by weight of the impregnated web, of a mixture comprising: (1) a chlorinated rubber or chlorinated polypropylene comprising about 65 percent by weight of chlorine; (2) about 5 to about 50 percent, by weight of said chlorinated rubber or chlorinated polypropylene, of a chlorinated terphenyl or chlorinated paraffin comprising about 40 to 70 percent by weight of chlorine; and (3) about 0.5 to about 10 percent, by weight of said chlorinated rubber or chlorinated polypropylene, of a polyglycidyl ether of a bisphenol, said fibrous web having been rigidified by said polyglycidyl ether of a bisphenol.

6. A shaped sheet as in claim 5 wherein said impregnating mixture additionally contains from 0 – 2 percent, by weight of said chlorinated rubber or chlorinated polypropylene, of finely divided carbon black.

7. A shaped sheet as in claim 6 which is a corrugated impregnated web of asbestos paper.

8. The method of making an acid-, alkali-, and water-resistant, flame-resistant sheet, adaptable to use in forming contact tower air and water contact bodies, which method comprises impregnating a fibrous web by contacting said web with a solution, in a volatile organic solvent, of a mixture comprising: (1) a chlorinated rubber or chlorinated polypropylene comprising about 65 percent by weight of chlorine; (2) about 5 to about 50 percent, by weight of said chlorinated rubber or chlorinated polypropylene, of a chlorinated terphenyl or chlorinated paraffin comprising about 40 to 70 percent by weight of chlorine; and (3) about 0.5 to about 10 percent, by weight of said chlorinated rubber or chlorinated polypropylene, of a polyglycidyl ether of a bisphenol present as a rigidifying agent for the impregnated web; and then removing said solvent from said web to leave from 10 to 30 percent, by weight of the impregnated web, of said mixture in said web.

9. The method as in claim 8 wherein said fibrous web comprises mineral fibers.

10. The method as in claim 8 wherein said fibrous web is formed into a shaped sheet immediately after impregnation with said solution.

11. The method as in claim 8 wherein only a portion of said solvent is removed from said web after impregnation, the partially dried web is then formed into a shaped sheet, and the remaining solvent is then removed from said web.

12. The method as in claim 8 wherein the dried impregnated web is remoistened with solvent to soften it, formed into a shaped sheet while soft, and then re-dried after shaping by removing said solvent.

* * * * *